United States Patent Office 3,501,714
Patented Mar. 17, 1970

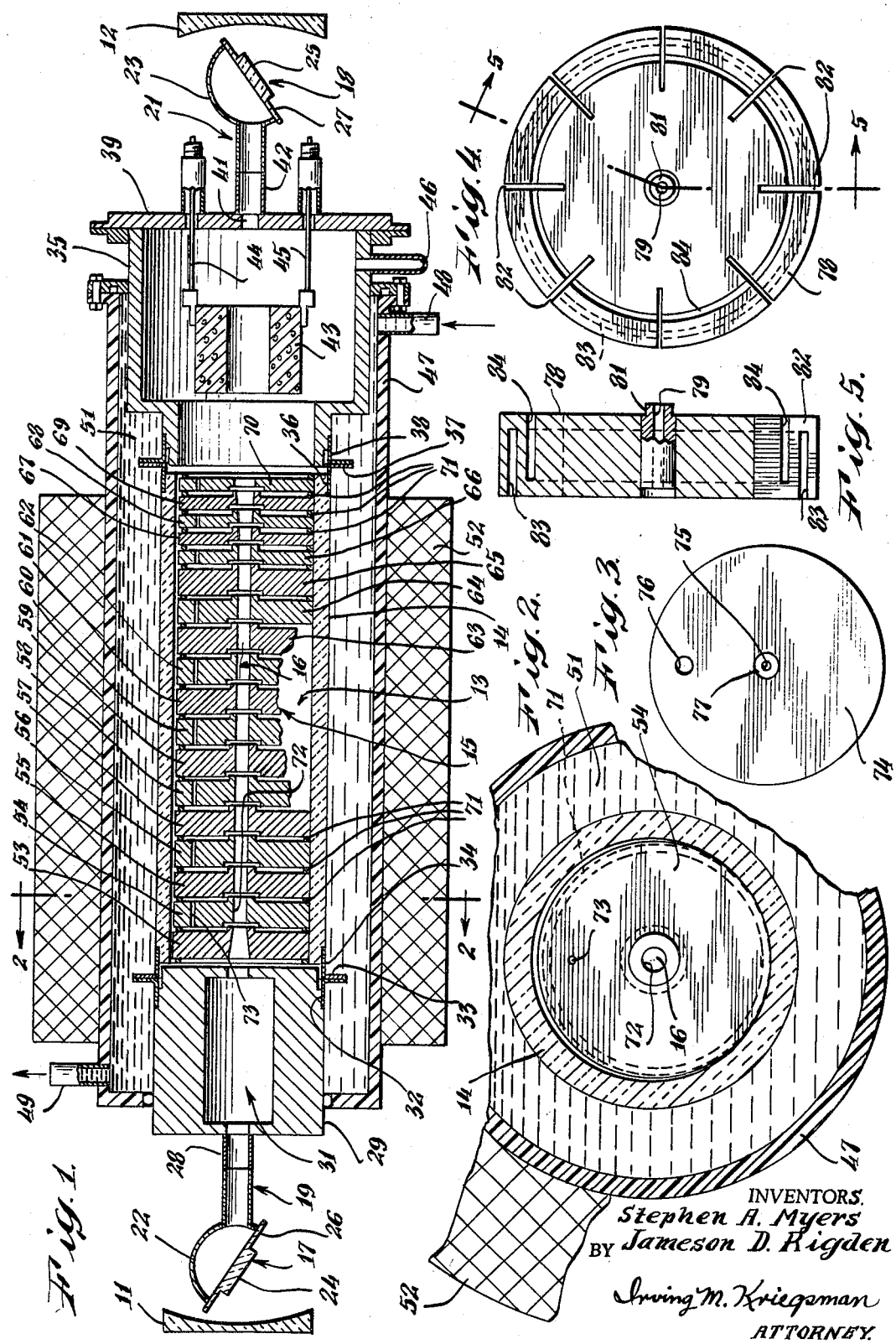

3,501,714
DC EXCITED GAS LASER TUBE WITH CONDUCTIVE SIDEWALLS
Stephen A. Myers, Stamford, and Jameson D. Rigden, Westport, Conn., assignors to The Perkin-Elmer Corporation, Norwalk, Conn., a corporation of New York
Filed Mar. 13, 1967, Ser. No. 622,483
Int. Cl. H01s 3/02, 3/04
U.S. Cl. 331—94.5
13 Claims

ABSTRACT OF THE DISCLOSURE

A DC excited gas laser in which the gas is confined in an elongated chamber having ceramic sidewalls. The gas discharge is produced in an open end plasma tube made up of a plurality of sections of a material having high thermal conductivity. The tube is located in the chamber. Heat produced by the gas discharge is removed from the chamber primarily by conduction through the chamber sidewalls. The chamber is cooled by circulating water and is surrounded by a solenoid which provides an axial magnetic field along the plasma tube. Electrodes for producing the DC discharge are located within the chamber. Novel shaped Brewster angle windows are used at the ends of the chamber.

---

This invention relates to lasers. More particularly, this invention relates to DC excited gas lasers.

Laser stands for "light amplification by stimulated emission of radiation." Following the proposal to extend the maser principle to the optical spectral region, some workers in the art have used the acronym "laser" instead of optical maser. Generally speaking, lasers or optical masers may be defined as devices for the generation or amplification of coherent monochromatic light waves in the optical region of the electromagnetic spectrum. The general principles of lasers are described in a paper entitled "Optical Masers" appearing in volume 204, No. 6 of the Scientific American, June 1961, pages 52 through 61.

Basically, a laser is made up of an active material that is capable of producing stimulated radiation, a mechanism for producing a population inversion in two of the characteristic energy level systems of the active material which on relaxation will produce coherent radiation, and a resonant cavity. The active material may be in the form of a solid, a liquid, a gas or a mitxure of gases. The mechanism for producing the population inversion is often referred to as the pumping mechanism. The resonant cavity may be in the form of a pair of mirrors, one of which is partly transmissive.

In this invention, we are concerned with lasers in which the active material is a gaseous media and in particular one of the noble gases, i.e., argon, xenon, krypton, etc.

One known method of pumping a gaseous media to achieve a population inversion is by means of a direct current discharge. Typically, the gas is contained and the discharge occurs in an elongated gas tight quartz tube having internal electrodes which are adapted to be connected to an external power source. The ends of the tube are sealed off with Brewster angle windows and the tube is located between a pair of mirrors. An example of this type of laser in which the gaseous media is a mixture of helium and neon may be found in U.S. Patent 3,242,439. A somewhat different mechanism for producing a population inversion in a gaseous media may be found in U.S. Patent 3,172,057.

Although it has been possible to attain laser action with a noble gas by using a DC excitation pumping mechanism such as shown in U.S. Patent 3,242,439, most commercial devices have suffered from a number of disadvantages. The majority of these problems have been found to result from the construction of the tube which holds the gas and in which the gas discharge is produced. Specifically, the high thermal dissipation rates through the sidewalls of the quartz tube and the positive ion bombardment damage to the sidewalls of the quartz tube, both of which are caused by the electrical discharge, have been found to drastically shorten the useful lifetime of the tube. Other problems associated with ion bombardment or sputtering damage that have been present include rapid gas cleanup requiring frequent gas refill, and the liberation of oxygen and other contaminants which lead to rapid cathode poisoning.

Accordingly, it is an object of this invention to provide a new and improved gas laser.

It is another object of this invention to provide a new and improved DC excited ion gas laser.

It is still another object of this invention to provide a new and improved argon laser.

It is yet still another object of this invention to provide a new and improved arrangement for producing a DC electrical discharge in a gaseous media for use in a laser.

It is another object of this invention to provide a DC excited argon gas laser capable of sustaining a continuous high current density DC electrical arc discharge in maintenance free operations for periods of over 1,000 hours.

It is still another object of this invention to provide a DC excited gas laser in which a clean vacuum environment can be maintained, which includes an internal gas return path, which is unaffected by thermal shock at ignition and which can be cooled with regular tap water.

The above and other objects are achieved by constructing a DC excited gas laser in which the gas is contained in a gas tight ceramic walled chamber and in which a gas discharge resulting in a population inversion is produced in an open end plasma tube disposed within the chamber. The plasma tube is made up of a plurality of sections of a material having high thermal conductivity and sputter resistance. The sections are spaced apart and electrically insulated from each other and float at an electric potential determined by that of the adjacent plasma arc column which they contain. The chamber is provided with a pair of electrodes which are located at opposite ends of the plasma tube. Heat generated by the electrical discharge is dissipated primarily by conduction through the chamber sidewalls and is removed by continuously flowing tap water. Another feature of the invention involves the use of a new type Brewster angle window at the ends of the chamber. Another feature of the invention involves the use of an axial magnetic field to enhance the output radiation.

Other features will become apparent and the invention will become more fully appreciated and better understood from the following detailed description when taken in conjunction with the accompanying drawings in which like reference numerals indicate like parts and wherein:

FIGURE 1 is a longitudinal cross section view of a laser constructed according to this invention;

FIGURE 2 is an enlarged lateral section view taken along lines 2—2 of FIGURE 1;

FIGURE 3 is an enlarged plan view of another embodiment of one of the discharge tube sections;

FIGURE 4 is an enlarged plan view of another embodiment of one of the discharge tube sections; and FIGURE 5 is a section view of the discharge tube section shown in FIGURE 4 taken along lines 5—5.

Referring now to the drawings, and in particular FIGURE 1, there is shown a laser which includes a pair of mirrors 11 and 12 which define an optically resonant cavity. One of the mirrors 11 is partly transmissive.

The laser further includes a gas tight chamber 13 for holding a quantity of an active gaseous material, such as, for example, argon.

The sidewalls of the chamber 13 are formed in part by a cylindrically shaped ceramic tube 14. The ceramic used should be a material that is vacuum tight, has high mechanical strength, has good thermal conductivity, is dimensionally stable, is capable of being precision ground to close tolerances and can be brazed to a metal. Another important property of the ceramic, namely its thermal coefficient of expansion will be discussed below. Examples of such ceramics are high grade alumina and beryllium oxide.

An elongated cylindrically shaped plasma discharge tube 15 is coaxially positioned within the ceramic tube 14. The plasma tube 15 has a narrow longitudinal central bore 16 which defines the plasma discharge path, that is, the path through which the arc discharge is produced.

The ends of the chamber 13 are defined by fused silica windows 17 and 18 which are inclined at Brewister's angle relative to the longitudinal axis of the plasma tube 15. The windows 17 and 18 are mounted on fused silica tubular stems 19, 21 respectively. Each stem has an integrally formed bubble shaped outer end 22, 23. End windows 17 and 18 each include a central body portion 24, 25 and an integrally formed thin peripheral flange 26, 27. The flanged portions of the windows are fused to the stems. The purpose of the peripheral flange portion is to prevent distortion of the central body portion while it is being fused to the stem.

Stem 19 is connected through a graded glass seal (not shown) to a stainless steel tube 28 which in turn is connected to one end of an anode.

Anode 29 is in the form of a copper block having a longitudinal central bore 31. The anode 29 is positioned so that its bore 31 is in axial alignment with the bore 16 of the tube 15. A steel flange 32 is brazed onto the other end of the anode 29. Another steel flange 33 is brazed onto a tantalum sleeve 34 which in turn is brazed onto the ceramic tube 14. Flanges 32 and 33 are welded together. Thus, the anode 29 forms a part of the chamber 13. Anode 29 is provided with suitable means (not shown) for receiving electrical leads from an external power source.

One end of a tubular stainless steel cathode housing 35 is connected to the other end of the ceramic tube 14. The connection includes a tantalum sleeve 36 which is brazed onto the ceramic tube 14 and a pair of brazed steel flanges 37 and 38 which are welded together. Flange 37 is brazed onto a tantalum sleeve and flange 38 is brazed onto the cathode housing 35. A stainless steel end plate 39 having a bore 41 is welded onto the other end of the housing 35. Stem 21 is connected to a stainless steel tube 42 which in turn is connected to the end plate 39.

A hollow tubular shaped barium impregnated porous tungsten cathode 43 is located at the other end of the plasma tube 15. The cathode 43 (which has an enclosed heater which is not shown) is connected to and supported by a pair of terminal assemblies 44 and 45 which are mounted on and extend through the end plate 39. The cathode 43 is in axial alignment with the bore 16 of the plasma tube 15.

Gases are admitted to and evacuated from the chamber 13 through a suitably located port 46.

The chamber is surrounded by a plastic housing or jacket 47 which may be connected at one end to the anode 29 and at the other end to the cathode housing 35. The housing 47 is provided with a fluid inlet port 48 at one end and a fluid outlet port 49 at the other end. A continuously flowing cooling fluid 51 removes the heat transmitted through the chamber walls. The outer surfaces of the anode 29 and the flanges 32 and 33 are coated with a high dielectric strength insulating garnish (not shown) to prevent the electrical discharge from short circuiting the anode 29 to the cathode housing 35 through the cooling fluid 51. Thus, ordinary tap water which is electrically conductive can be used as the cooling fluid 51.

In operation, the chamber 13 is filled with an active gaseous material, such as argon, and a power source which is connected to the anode 31 and the cathode 42 is activated, producing a gas discharge along the bore 16 of the plasma tube 15. Heat generated by the arc discharge is transmitted by radial heat conduction from the plasma tube 15 to the ceramic tube 14 to the cooling fluid 51.

A cylindrically shaped hollow solenoid 52 surrounds the chamber 13 to provide an axial magnetic field along the bore 16 of the tube 15. This magnetic field provides enhancement of the coherent light output.

The plasma tube path which is defined by the bore 16 is uniform in diameter at its central portion and tapers out slightly at either end. The tapering nearest the cathode end parallels the magnetic field lines produced by the solenoid 52.

The plasma tube 15 comprises a plurality of sections 53 through 70 which are electrically and physically separated by fused silica spacer rings 71. In order to minimize the potential difference between the cathode end of the tube 15 and the plasma column, sections 66 through 70 are made half as wide as sections 53 through 65. This, in turn, reduces sputtering damage at the cathode end of the tube 15.

Removal of heat from the chamber 13 by conduction without overheating critically depends on achieving good thermal contact between the outer surfaces of the sections 53 through 70 and the inner wall of the ceramic tube 14.

The plasma tube sections are essentially solid disc shaped elements having a centrally located recess on one side and a centrally located boss on the other side. The sections are fabricated from a material that has high thermal conductivity and whose thermal coefficient of expansion is less than that of the ceramic tube 14. Each disc shaped element has a small central bore, identified by reference numeral 72 in the disc shown in FIGURE 2 and an off-centered auxiliary bore, identified by reference numeral 73 in FIGURE 2. The purpose of the auxiliary bore is to provide an internal gas return path. Suitable materials that may be used for the tube sections include tantalum, tungsten, molybdenum and graphite.

Sections 53 through 70 are sized so as to be slightly smaller in diameter than the inside diameter of the ceramic tube 14. It has been found that a high percent of evenly distributed contact area between the plasma tube 15 and the ceramic tube 14 is extremely desirable and can be achieved by carefully controlling the difference in the plasma tube and ceramic tube diameters, the degree of roundness of each tube, and quality of the surface finish of each tube. Achieving good thermal contact between the plasma tube 15 and the ceramic tube 14 minimizes the temperature rise of the tube sections and prevents excessive thermal expansion of the sections which would otherwise rupture the ceramic tube 14 through the exertion of excessive mechanical tensile stress. The use of a solid disc design for the tube sections results in a sufficiently uniform distribution of the heat flux around the sidewalls of the ceramic tube to prevent excessive thermally induced tensile stresses in the ceramic tube which would otherwise lead to failure.

Sections 53 through 70 are disposed within the ceramic tube 14 so that their main bores are in axial alignment but their auxiliary bores are out of alignment. The auxiliary bores can be misaligned by, for example, axially rotating some of the discs (54, 56, 58, etc.) a significant number of degrees, i.e., approximately 30°.

Experimental measurements have shown that at power dissipation rates of 200 watts per cm. along the discharge column, the disc temperature does not exceed 250° C.

Referring now to FIGURE 3, there is shown a modified version of a plasma tube section. In this embodiment, the section is made up of a solid disc 74 which may be fabricated from molybdenum, tantalum, tungsten or graphite. The section is provided with a centrally located main bore 75 and an off-center auxiliary bore 76. Additionally, the section is provided with a removable cylindrical liner insert 77 which may be formed from molybdenum, tungsten, tantalum or beryllium oxide.

Referring now to FIGURES 4 and 5, there is shown still another embodiment of a plasma tube section. In this embodiment, the section is in the form of a solid disc 78 having a centrally located bore 79 in which is disposed a removable cylindrical liner insert 81. The liner insert 81 is the same shape as the liner insert in the FIGURE 3 embodiment. The outer portion of the disc 78 is designed so as to create a plurality of spring-like members which are compliant in the radial direction. This is achieved by forming a plurality of radial slots 82 which extend inward from the outer surface approximately half way to the center and a pair of circular grooves 83 and 84. Each groove extends inward approximately ⅘ of the disc width. One of the grooves 83 extends inwardly from the front whereas the other groove 84 extends inwardly from the rear. Both grooves are located near the periphery of the disc. The bore of the liner insert 81 defines the plasma discharge path. Grooves 83 and 84 provide a return path from the gas and additionally cooperate with the radial slots to make the outermost portion of the disc flexible. In order to prevent a gas discharge from occurring along the gas return path, a plurality of these discs when used to form a plasma tube are arranged so that the radial slots of alternate discs are out of alignment. The outer diameter of the discs are initially slightly larger than the inside diameter of the surrounding ceramic tube. Upon insertion into the ceramic tube the spring members are slightly compressed insuring contact with the ceramic tube. Maintaining a high quality of surface finish on both the discs and the ceramic tube insures that the thermal contact is uniformly distributed around its circumference. In operation, thermal expansion of the discs in a radial direction is taken up by the compression of the spring portion and serves to minimize the force transmitted to the ceramic tube. The disc and the insert may be made from any material which retains its elasticity at temperatures up to 300° C. For example, the disc material may be beryllium, copper, molybdenum, tantalum, stainless steel or graphite. The liner may be by way of example, materials such as molybdenum, tungsten, tantalum or beryllium oxide.

A laser was built in accordance with this invention and was successfully operated. The laser employed an alumina cylinder which was 3.860″ in length, and which had an inside diameter of 1.1800″, and an outside diameter of 1.748″. The plasma tube contained nine solid molybdenum disc sections. The first three discs at the cathode end were .25″ wide and the remaining six discs were .50″ wide. The diameter of the discs was .015″ less than the inside diameter of the alumina cylinder. The inside diameter of the alumina cylinder was held to a tolerance of ±.0002″ and the outside diameter of the discs was centerless ground to an identical tolerance. The surface finish of the outside of the disc was 16 RMS or better, and the surface finish on the inside wall of the alumina tube was 32 RMS or better. Tantalum liner inserts were employed. The center bore diameter in the six wider discs was 3.0 mm. The bore through the three narrower discs at the cathode end of the tube were tapered. The chamber was filled to a pressure of approximately .5 torr of argon gas. The laser was operated continuously for a total period of over 1300 hours with no significant changes in the operating parameters. The coherent light output remained relatively constant over this period at approximtaely 2.0 mw. The tube current was regulated at 20 a. over the operating period. A voltage drop from anode to cathode at this current was observed to be constant at 51.5 volts. A water flow rate of three gallons per minute was utilized for cooling purposes.

I claim:
1. A DC excited gas laser comprising a resonant cavity, a gas tight elongated cylindrical chamber having sidewalls formed from a thermally conductive material located within said resonant cavity, a gaseous active material disposed within said gas tight chamber, an open end elongated plasma discharge tube formed from a material having high thermal conductivity disposed within said chamber, the cross-sectional diameter of the chamber being slightly greater than the cross-sectional diameter of the discharge tube, and means extending into said chamber and connected to an external power source for producing a direct current discharge along the longitudinal axis of the plasma discharge tube causing said gaseous active material to lase; and the diameter of the discharge tube to expand due to the heat created therein and to be in contact with the chamber sidewalls and whereby the heat generated in said plasma discharge tube is dissipated primarily by conduction through the chamber sidewalls.

2. The invention according to claim 1 and wherein said chamber sidewalls comprise an elongated ceramic cylindrical tube and wherein said open end plasma discharge tube is disposed within said elongated ceramic cylindrical tube.

3. The invention according to claim 2 and wherein said open end plasma discharge tube comprises a plurality of spaced apart disc shaped sections of a thermally conductive material, each section having a centrally located bore defining a plasma discharge path.

4. The invention according to claim 3 and wherein said open end plasma discharge tube further includes electrical insulating means positioned between adjacent sections.

5. The invention according to claim 1 and wherein said means in communication with said chamber and adapted to be connected to an external power source comprises a pair of electrodes, one of said pair of electrodes being positioned near each end of said open end plasma discharge tube.

6. The invention according to claim 1 and further including means for producing an axial magnetic field about said open end plasma discharge tube.

7. The invention according to claim 1 and further including means surrounding said chamber for cooling said chamber.

8. The invention according to claim 1 and wherein said chamber is in the form of an elongated structure having transparent end windows, said end windows comprising a solid disc shaped central portion and an integrally formed peripheral flange.

9. The invention according to claim 3 and wherein said disc shaped sections are formed from molybdenum.

10. The invention according to claim 3 and wherein said disc shaped sections have resilient outer portions.

11. The invention according to claim 1 and wherein said gaseous active material is a noble gas.

12. The invention according to claim 2 and wherein said ceramic cylindrical tube is fabricated from alumina.

13. A chamber assembly for use in a DC excited gas laser comprising: an elongated gas tight chamber having ceramic tubular sidewalls adapted to hold an active gaseous material, a pair of electrodes adapted to be connected to an external DC source, one of said electrodes being located at each end of said ceramic tubular sidewalls, and transparent end plates, an open end plasma discharge tube comprising a plurality of spaced apart sections having thermally conductive sidewalls axially disposed within said ceramic tubular sidewall, means for cooling said chamber, and means for producing an axial magnetic field along the plasma discharge tube, the cross-sectional diameter of the chamber being slightly greater than the cross-sectional diameter of the discharge tube, the discharge tube being made of a material having high thermal conductivity and the coefficient of expansion of the material forming the discharge tube being less than the coefficient of expansion of the material forming the chamber sidewalls.

References Cited

UNITED STATES PATENTS

| | | | |
|---|---|---|---|
| 3,394,320 | 7/1968 | Medicus | 331—94.5 |
| 3,420,603 | 1/1969 | Whilems | 331—94.5 X |

OTHER REFERENCES

Rigden, "A Metallic Plasma Tube for Ion Lasers," IEEE J. Quant. Electr. QE–1, August 1965, p. 221.

Labuda et al., "Continuous-Duty Argon Ion Lasers," IEEE J. Quant. Electr. QE–1, September 1965, pp. 273–9.

Gould, "Collision Lasers," Applied Optics Sup. on Chem. Lasers, 1965, pp. 59, 66–7.

Knudsen et al., "Argon Ion Lasers," Sperry Eng. Rev., 19 (1), June 2, 1966, pp. 27–31.

Paananer, "Progress in ionized-argon lasers" IEEE Spectrum, June 1966, pp. 88–99.

Hernquist et al., "Construction of Long Life Argon Lasers," IEEE J. Quant. Electr., QE–3, February 1967, pp. 66–72.

RONALD L. WIBERT, Primary Examiner

R. J. WEBSTER, Assistant Examiner